United States Patent [19]

Cao

[11] Patent Number: 4,737,477

[45] Date of Patent: Apr. 12, 1988

[54] CERAMIC POWDER AND ARTICLES

[75] Inventor: Shuliang Cao, Jinan, China

[73] Assignee: Shandong Providence New Materials Institute, Jinan, China

[21] Appl. No.: 846,247

[22] Filed: Mar. 31, 1986

[30] Foreign Application Priority Data

Apr. 1, 1986 [CN] China .................................. 85102464

[51] Int. Cl.$^4$ ........................ C04B 35/02; C09C 1/22; H01L 31/00
[52] U.S. Cl. ...................................... 501/132; 501/94; 501/126; 106/299; 106/302; 106/304; 106/309; 136/243
[58] Field of Search ........................ 501/94, 126, 132; 106/300, 302, 304, 309

[56] References Cited

U.S. PATENT DOCUMENTS

| | | | |
|---|---|---|---|
| 2,811,463 | 10/1957 | Burgyan | 106/304 |
| 3,094,428 | 6/1963 | Hamilton et al. | 106/302 |
| 3,528,839 | 9/1970 | Weber | 106/302 |
| 3,561,989 | 2/1971 | Weber | 106/304 |
| 4,090,888 | 5/1978 | Rademachers et al. | 106/304 |
| 4,205,996 | 6/1980 | Eppler | 106/302 |

FOREIGN PATENT DOCUMENTS

| | | | |
|---|---|---|---|
| 2518283 | 10/1976 | Fed. Rep. of Germany | 106/304 |
| 2643246 | 4/1977 | Fed. Rep. of Germany | 106/304 |
| 2625106 | 12/1977 | Fed. Rep. of Germany | 106/304 |
| 0783287 | 12/1980 | U.S.S.R. | |

*Primary Examiner*—William R. Dixon, Jr.
*Assistant Examiner*—James M. Hunter, Jr.
*Attorney, Agent, or Firm*—Morgan & Finnegan

[57] ABSTRACT

The present invention discloses a novel black ceramic and a method of producing the same. This method employs a variety of industrial wastes and natural ore as starting materials to greatly decrease the cost of producing black ceramic materials. The black ceramic material of the present invention has many uses, such as, infrared radiating elements, fillers in plastics and rubbers, pigments in decorative architectural coatings and surfaces.

11 Claims, No Drawings

CERAMIC POWDER AND ARTICLES

FIELD OF THE INVENTION

The present invention relates to a method of producing a black ceramic powder materials and ceramic articles therefrom from a variety of industrial wastes and natural metal ores containing titanium, vanadium, chromium and manganese, and to the black powder and article produced by this method.

BACKGROUND OF THE INVENTION

For thousands of years, ceramic has been generally produced from naturally occurring ceramic materials. Only since about ten years ago, ceramic materials and articles with special properties to meet specific needs have been manufactured from industrially produced materials. Novel ceramic materials are being developed continuously to meet world wide demand. This is because articles made of ceramic are resistant to corrosion, oxidation, peeling, aging and high temperatures. Ceramic articles also possess good hardness characteristics and other properties which are not found in articles made of comparable materials.

It is known that black articles rapidly absorb light and heat energy. Moreover, black articles emit infrared raidation when heated. Thus, black pigmented ceramic materials are desirable for use as absorbing and/or emitting elements for transforming heat energy into ligh energy or vice versa.

Heretofore, black pigments suitable for production of colored ceramic materials are usually made of the oxides of manganese, cobalt and nickel. These compounds are very expensive, making it difficult to produce black ceramic articles in large quantities. Therefore, up to the present, infrared absorbing or emitting elements have been made by coating a layer of an infrared radiating or absorbing material onto a substrate such as metals, ceramics made from silicon carbide or zircon sand, or plastics. However, these coating processes are complex and present many problems, such as, aging or peeling off of the coating layer. In addition, the coating processes are very expensive.

Therefore, for many years it has been the objective of many to produce low cost black ceramic materials for the production of articles with a high rate of infrared absorption and radiation. It has been found unexpectedly that some industrial wastes and natural ores can be used to this purposes.

SUMMARY OF THE INVENTION

The present invention provides a method of producing black ceramic materials or articles from a variety of industrial wastes and easily obtained natural ores containing titanium, vanadium, chromium, and manganese. The present invention provides a black ceramic powder material, containing 0.1% to 20% titanium dioxide by weight. the black ceramic powder can be used to form black ceramic articles containing at least 0.05% to 20% titanium dioxide or as a black pigment for coatings, in rubbers, plastics, ceramics or any material which require a black coloring agent.

DETAILED DESCRIPTION OF THE INVENTION

According to this invention, industrial wastes, natural ores or floatation tailings of some suitable ores can be used to produce black ceramic powder or articles made therefrom. Depending on the particular raw material, additives may be incorporated. The method of producing a black ceramic powder according to the present invention is very simple. No special equipment or processing step is necessary.

A feature of the starting material of this invention is that the total amount of titanium dioxide, vanadium pentoxide, chromium trioxide and mangenese oxide in the starting materials is at least about 3% by weight; provided that, of this total amount, at least 0.1% is titanium dioxide, Another important feature of the method of this invention is that the starting materials is very cheap and easy to obtain. It has been found that suitable starting materials include industrial wastes such as ferro-silico-chromium slag, silico-chromium slag, ferro-nickel molten slag, ferro-titanium slag, ferro-tungsten slag, silico-manganese slag, ferro-chromium slag, copper-melting slag, pyrite cinder, vanadium residue, chromium slag, rust and corrosion substances of steel or iron and various natural ores such as iron ore, sefstromite, chromite and the floatation tailing from these ores.

Such industrial wastes have caused many environmental problems and require expensive treatment processes before they can be discarded. The present invention utilizes such wastes as the raw materials for the production black ceramic materials. Thus, several problems are solved at the same time.

The term "vanadium residue" mentioned above refers to a residue obtained from impregnation of a vanadium slag, a liquid iron containing vanadium product from refining vanadititaniferrous magnetite.

Additives may be incorporated from the production of black ceramic materials according to the present invention. Such additives include clay, kaolin, procelain stone, earthenware clay, coal clay, shale, coal stone, red mud, boron mud, titanium slag, lemon slag, furfural slag, methyl cellulose, starch, arabic gum, water glass, binders and some metal oxides.

The preferred raw materials for the present invention are industrial wastes, most preferably vanadium residue, ferro-nickel melting slag, pyrite cinder and chromium slag. When vanadium residue is used as the raw material, a very good ceramic material is obtained without the need for additives.

Where a suitable natural ore is abundant and available or where there is a floatation site close by, both the ore and the tailings can be used as the starting materials.

The process for producing the black ceramic powder material of present invention may be one of the following:

1. mixing one or several different raw materials together, grinding the mixture to obtain a powder of less than 20 mesh;
2. calcining the starting material to a temperature above 800° C., preferably about 1000° C. to 1400° C., for 1 to 60 minutes, then grinding the calcined material to a fine powder of less than 20 mesh; or
3. grinding the starting material into a powder, shaping the ground powder into a desired form, calcining the formed material and then grinding the calcined form into a powder of a suitable size.

The black ceramic powder material produced by the above mentioned processes has good agglomeration properties. The powder can be shaped by conventional methods and calcined into articles with various forms.

Depending on the composition of the starting material, which may include an additive, the composition of the black ceramic powder of the present invention may vary over a broad range. However, it should be emphasized that the powder must contain 0.1% to 20% titanium dioxide, 0.1% to 20% vandium pentoxide, or 0.2% to 30% titanium dioxide and vanadium pentoxide by weight. The total amount of titanium dioxide, chromium trioxide and manganese oxide is at least 3% by weight, or the total amount of titanium dioxide, vanadium pentoxide, chromium trioxide, manganese oxide and iron trioxide is at least 20% by weight in the powder. The black ceramic powder of this invention generally comprises 0.1% to 20% vanadium pentoxide, 2% to 20% titanium dioxide, 2% to 20% manganese oxide, 0.1% to 20% chromium trioxide, and 20% to 80% iron trioxide; more preferably, it comprises 0.5% to 2% vanadium pentoxide, 3% to 20% titanium dioxide, 4% to 15% manganese oxide, 1% to 20% chromium trioxide, and 30% to 80% iron trioxide; all of the percentages being by weight based on the total weight of the composition.

Additives may also be used during the process of manufacturing the articles of present invention. However, the formed article contain at least a total amount of 1% of titanium dioxide, vanadium pentoxide, chromium trioxide and manganese oxide. Generally, the formed article contains 0.1% to 2% vanadium pentoxide, 1% to 12% titanium dioxide, 1% to 15% manganese oxide, and 0.1% to 20% chromium trioxide, the percentages being by weight based on the total weight of the article.

The ceramic articles may be formed into various shapes for varying applications; such as, infrared raidating elements, heat collectors, heat exchangers, heat radiators, liners for furnaces, or decorative layers for buildings. The infrared raidating elements including infrared heaters and infrared generators in the form of coated or uncoated plates, tubes, or convex shapes.

Besides making the above articles, the black ceramic powder can also be used in various applications as follows:

1. As a black pigment in glazes, composite coating or any composition requiring a black coloring agent;
2. As a heat-absorbing material for the walls of a furnace to absorb and transmit heat to objects to the heated;
3. As a stable black powder filler in plastics and rubbers;
4. As a black filler for decorative coatings and in the manufacture or decorative surfaces for use in architecture.

EXAMPLE 1

Vanadium residue containing at least a total of about 3% by weight of vanadium pentoxide, titanium dioxide, chromium trioxide and managanese oxide was ground in a ball-mill to a powder of 160 mesh.

EXAMPLE 2

Vanadium residue of Example 1 was calcined at 1150° C. for 30 minutes, then ground to 160 mesh powder. The composition of the powder is indicated in the following table.

| Composition (%) | | | | | | | | |
|---|---|---|---|---|---|---|---|---|
| VO | FeO | SiO | MnO | TiO | CrO | MgO | AlO | CaO |
| 1.18 | 64.42 | 13.26 | 6.74 | 8.52 | 1.19 | 0.65 | 3.13 | 0.96 |

EXAMPLE 3

Two parts of pyrite cinder ground by a dry method to a powder of 160 mesh was mixed with one part of a chromium residue powder having a size of 140 mesh together with a suitable amount of water. The homogeneous mixture was shaped by conventional means into a rod having a diameter of 10 mm. After drying the rod was broken into pellets in lengths of 15 to 20 mm. The pellets were calcined at 1220° C. for 10 minutes, then ground into a black powder of 160 mesh.

EXAMPLE 4

98 parts of the powder of Example 1 and two parts of methyl cellulose were mixed with a suitable amount of water. The mixture was made into particles with diameters of 0.5 mm to 2 mm.

70 parts of clay, 10 parts of arenaceous quartz and 10 parts of feldspare were mixed, and ground into powder.

10 part of the particles and 90 part of the powder were mixed, and shaped into a small plate of 20 mm×20 mm×5 mm. The plate was calcined at 120° C. for one hour. The product was a small procelain plate having a white base with black points interspersed therein.

EXAMPLE 5

The black powder of Example 2 was used as a filler for polyethylene plastic.

Black polyethylene pellets were produced used 10% by weight of the powder of Example 2 and 90% by weight of polylethylene.

EXAMPLE 6

The black ceramic powder of Example 1 was mixed with a suitable amount of water and applied onto the inner walls of a furnace. After 24 hours of heating at a temperature of 1200° C. to 1400° C., a black ceramic coating formed on the surface of the oven walls. The coating depth was about 0.2 mm to 1 mm.

It was found that a furnace with such a coating consumes 3% to 5% less energy than a furnace without the heat absorbing black ceramic coating.

EXAMPLE 7

A mixture of 99.5 parts of the powder of Example 1, 0.5 parts of methyl cellulose and water was shaped into a tube, dried and calcined at 1120° C. for one hour. The infrared radiating rate of the ceramic tube so made having an outer diameter of 31 mm, inner diameter of 25 mm, and length of 40 mm was 0.84 to 0.86 at 500° C. to 600° C.

EXAMPLE 8

A mixture of 60 parts of the black ceramic powder of Example 2, 20 parts of clay, 10 parts of talc and 0.5 parts sodium carbonate was ground with a ball-mill, then shaped into a tube, dried, and calcined at 1100° C. for one hour. The infrared radiating rate of the tube so made having an outer diameter of 32 mm, inner diameter of 25 mm and length of 1000 mm was 0.8394 to 0.8620 at 500° C. to 600° C.

EXAMPLE 9

A mixture of 7 parts of the ceramic powder of Example 3 and 3 parts of a 80 mesh clay powder was shaped and calcined at 1170° C. for 6 hours. The infrared radiating rate of the black ceramic body so obtained is 0.857 to 0.867 at 500° C. to 600° C.

EXAMPLE 10

The mixture of Example 8 was made into a pulp with water, then poured into a mold wherein an electrothermal wire was inserted. The article was calcined in the mold at 1100° C. for 1 hour. The product is a core-type infrared element having a diameter of 15 mm, length of 400 mm and electric work rate of 300 W.

EXAMPLE 11

The mixture of Example 8 was molded, dried, and calcined at 1100° C. for 1 hour. The product was a tank having an inlet and an outlet for water, a length of 640 mm, width of 420 mm, height of 70 mm, and a wall thickness of 3 mm. The tank is useful as a solar energy collector.

EXAMPLE 12

A mixture of 60 parts of the ceramic powder of Example 2 and 40 parts clay powder of 80 mesh was shaped and calcined at 1140° C. for 2 hours. The product was a 100 mm×100 mm×8 mm black ceramic plate.

EXAMPLE 13

The mixture of Example 8 was made into a paste with water. The pulp was poured into a mold. After releasing from the mold, it was dried and calcined at 1100° C. for one hour. The product has a height of 300 mm, and a wall thickness of 2 mm, All of the percentages herein mentioned are by weight based on the total weight of the composition or article.

I claim:

1. A process for producing a black ceramic powder comprising a mixture of 0.5% to 2% by weight of vanadium pentoxide, 3% to 20% by weight titanium dioxide, 4% to 15% by weight manganese oxide, 1% to 20% by weight chromium trioxide, and 30% to 80% by weight iron trioxide based on the weight of the black ceramic powder from a starting material containing industrial wastes selected form the group cosnisting of vanadium residue, pyrite cinder and chromium slag the steps of the process comprising:
    (a) mixing the starting materials and grinding the mixture to obtain a powder of less than 20 mesh;
    (b) calcining the starting material for 1 to 60 minutes at a temperature above 800° C.; and
    (c) then grinding the calcined material to a powder.

2. A process according to claim 1 wherein the black ceramic powder comprises a mixture of at least 20% by weight vanadium pentoxide, titanium oxide, manganese oxide, chromium trioxide and iron trioxide based on the total weight of the powder.

3. A process according to claim 1 wherein the calcining temperature is about 1000° C. to 1400° C.

4. A process according to claim 1 wherein the industrial waste is vanadium residue.

5. A black ceramic powder comprising vanadium pentoxide, titanium dioxide, manganese oxide, chromium trioxide and iron trioxide produced in accordance with the process of claim 1.

6. A black ceramic powder comprising vanadium pentoxide, titanium dioxide, manganese oxide, chromium trioxide and iron trioxide produced in accordance with the process of claim 2.

7. A ceramic article made from the black ceramic powder of claim 5.

8. A ceramic article made from the black ceramic powder of claim 6.

9. A ceramic article according to claim 7 wherein the article is selected from the group consisting of an infra red absorbing or emitting element, a heat collector, a heat exchanger, a heat radiator, a furnace liner and a ceramic plate.

10. A black ceramic solar energy collector formed from the black ceramic powder according to claim 5.

11. A black ceramic solar energy collector formed from the black ceramic powder according to claim 6.

* * * * *